(12) United States Patent
Singh et al.

(10) Patent No.: US 11,153,217 B1
(45) Date of Patent: Oct. 19, 2021

(54) SYSTEMS AND METHODS FOR POLICING NETWORK TRAFFIC RATES

(71) Applicant: Juniper Networks, Inc., Sunnyvale, CA (US)

(72) Inventors: Prashant Singh, Sunnyvale, CA (US); Sreekanth Rupavatharam, Sunnyvale, CA (US)

(73) Assignee: Juniper Networks, Inc, Sunnyvale, CA (US)

( * ) Notice: Subject to any disclaimer, the term of this patent is extended or adjusted under 35 U.S.C. 154(b) by 149 days.

(21) Appl. No.: 16/699,553

(22) Filed: Nov. 30, 2019

(51) Int. Cl.
*H04L 12/851* (2013.01)
*H04L 12/813* (2013.01)
*H04L 12/823* (2013.01)
*H04L 12/805* (2013.01)
*H04L 29/06* (2006.01)
*H04L 12/825* (2013.01)
*H04L 12/801* (2013.01)

(52) U.S. Cl.
CPC .......... *H04L 47/2441* (2013.01); *H04L 47/20* (2013.01); *H04L 47/25* (2013.01); *H04L 47/29* (2013.01); *H04L 47/32* (2013.01); *H04L 47/365* (2013.01); *H04L 63/1458* (2013.01)

(58) Field of Classification Search
CPC ... H04L 47/2441; H04L 47/365; H04L 47/25; H04L 47/32; H04L 47/20; H04L 63/1458; H04L 47/29; H04L 47/22; H04L 69/163; H04L 12/5602
See application file for complete search history.

(56) References Cited

U.S. PATENT DOCUMENTS

| | | | |
|---|---|---|---|
| 2004/0022193 A1* | 2/2004 | Davies | H04L 12/5602 370/235 |
| 2005/0201284 A1* | 9/2005 | Cheriton | H04L 69/163 370/232 |
| 2017/0279741 A1* | 9/2017 | Elias | H04L 47/22 |

* cited by examiner

*Primary Examiner* — Vinncelas Louis
(74) *Attorney, Agent, or Firm* — FisherBroyles, LLP

(57) ABSTRACT

The disclosed method may include (1) determining a size of a packet received at a network device, (2) identifying, within a plurality of packet policers that track rates of packets with various sizes received at the network device, a packet policer that tracks rates of packets whose sizes are within a range that includes the size of the packet, (3) determining a current rate of packets tracked by the packet policer, and then (4) handling the packet based at least in part on whether the current rate exceeds a threshold rate. Various other apparatuses, systems, and methods are also disclosed.

20 Claims, 12 Drawing Sheets

| | Table 502 | |
|---|---|---|
| Packet Policer ID | Policer Range (bytes) | Packet Rate (packets per second) |
| 1 | 0-750 | 2500 |
| 2 | 751-1500 | 2000 |

*FIG. 5*

Table
602

Packet Policer ID    Policer Range (bytes)    Threshold Rate (packets per second)
1                    0-750                    2500
2                    751-1500                 2000

Total Threshold Rate: 4500 packets per second

Table
604

Packet Policer ID    Policer Range (bytes)    Threshold Rate (packets per second)
1                    0-750                    2222
2                    751-1500                 1778

Total Threshold Rate: 4000 packets per second

Table
606

Packet Policer ID    Policer Range (bytes)    Threshold Rate (packets per second)
1                    0-750                    2778
2                    751-1500                 2222

Total Threshold Rate: 5000 packets per second

*FIG. 6*

Table
702

| Packet Policer ID | Bias | Policer Range (bytes) | Threshold Rate (packets per second) |
|---|---|---|---|
| 1 | -5% | 0-750 | 2375 |
| 2 | — | 751-1500 | 2125 |

Total Threshold Rate: 4500 packets per second

*FIG. 7*

Table 802

| Packet Policer ID | Policer Range (bytes) | Threshold Rate (packets per second) |
|---|---|---|
| 1 | 0-750 | 1778+400=2178 |
| 2 | 751-1500 | 1422+400=1822 |

Total Threshold Rate: 4000 packets per second
Keep-Aside Percentage: 20%
Keep-Aside Allocation: Equal

Table 804

| Packet Policer ID | Policer Range (bytes) | Threshold Rate (packets per second) |
|---|---|---|
| 1 | 0-750 | 1778+356=2134 |
| 2 | 751-1500 | 1422+444=1866 |

Total Threshold Rate: 4000 packets per second
Keep-Aside Percentage: 20%
Keep-Aside Allocation: Inversely Proportional to Incoming Packet Rate

Table 806

| Packet Policer ID | Policer Range (bytes) | Threshold Rate (packets per second) |
|---|---|---|
| 1 | 0-500 | 1778+267=2045 |
| 2 | 501-1500 | 1422+533=1955 |

Total Threshold Rate: 4000 packets per second
Keep-Aside Percentage: 20%
Keep-Aside Allocation: Proportional to Policer Range

*FIG. 8*

Table
902

| Packet Policer ID | Policer Range (bytes) | Packet Rate (packets per second) |
|---|---|---|
| 1 | 0-200 | 1000 |
| 2 | 201-400 | 2000 |
| 3 | 401-600 | 3000 |
| 4 | 601-800 | 0 |
| 5 | 801-1000 | 0 |
| 6 | 1001-1200 | 2000 |
| 7 | 1201-1400 | 500 |
| 8 | 1401-1600 | 200 |

*FIG. 9*

Table
1002

| Packet Policer ID | Policer Range (bytes) | Packet Threshold (packets per second) |
|---|---|---|
| 1 | 0-400 | 3000 |
| 2 | 401-1000 | 3000 |
| 3 | 1001-1600 | 3000 |

Total Threshold Rate: 9000 packets per second

*FIG. 10*

SYSTEMS AND METHODS FOR POLICING NETWORK TRAFFIC RATES

BACKGROUND

Denial-of-service (DoS) attacks and related types of attacks may involve directing a high volume of traffic to a particular network resource (such as a website, server, application, network interface, and the like). These attacks may overwhelm and/or overload the network resource, thereby preventing the network resource from fulfilling legitimate service requests. To reduce disruptions caused by DoS attacks and similar attacks, network administrators may implement traffic policers that control the volume of traffic handled and/or processed by a network resource. These traffic policers may attempt to prevent a network resource from being overloaded with illegitimate packets by limiting the rate at which a network resource receives incoming packets (whether the incoming packets are illegitimate or not).

In one example, a traditional traffic policer may begin discarding packets once the total bandwidth of incoming packets exceeds a threshold (e.g., 100 megabytes per second). In another example, a traditional rate policer may begin discarding packets once the total rate or number of incoming packets exceeds a threshold (e.g., 10000 packets per second). Unfortunately, these conventional traffic policing technologies may disproportionately and/or unduly discard legitimate packets. For example, a traffic policer that limits the total bandwidth of incoming packets may discard legitimate packets with relatively small sizes if a network resource receives even a low number of larger-sized packets. In addition, a rate policer that limits the rate of incoming packets may discard legitimate packets of any size if a network resource receives a high number of small packets. Attackers may exploit these vulnerabilities, thereby rendering many traditional traffic policing systems ineffective and/or inadequate.

The instant disclosure, therefore, identifies and addresses a need for improved systems and methods for policing network traffic rates.

SUMMARY

As will be described in greater detail below, the present disclosure generally relates to systems and methods for policing network traffic rates. In one example, a computer-implemented method for accomplishing such a task may include (1) determining a size of a packet received at a network device, (2) identifying, within a plurality of packet policers that track rates of packets with various sizes received at the network device, a packet policer that tracks rates of packets whose sizes are within a range that includes the size of the packet, (3) determining a current rate of packets tracked by the packet policer, and then (4) handling the packet based at least in part on whether the current rate exceeds a threshold rate.

As another example, a system for implementing the above-described method may include various modules stored in memory. The system may also include at least one hardware processor that executes these modules. For example, the system may include (1) a sizing module that determines a size of a packet received at a network device, (2) a policing module that identifies, within a plurality of packet policers that track rates of packets with various sizes received at the network device, a packet policer that tracks rates of packets whose sizes are within a range that includes the size of the packet, (3) a rate module that determines a current rate of packets tracked by the packet policer, and (4) a handling module that handles the packet based at least in part on whether the current rate exceeds a threshold rate.

As a further example, a non-transitory computer-readable medium may include one or more computer-readable instructions that, when executed by at least one processor of a computing device, cause the computing device to (1) determine a size of a packet received at a network device, (2) identify, within a plurality of packet policers that track rates of packets with various sizes received at the network device, a packet policer that tracks rates of packets whose sizes are within a range that includes the size of the packet, (3) determine a current rate of packets tracked by the packet policer, and then (4) handle the packet based at least in part on whether the current rate exceeds a threshold rate.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 5 is a table that describes exemplary packet policers.

FIG. 6 is an additional table that describes exemplary packet policers.

FIG. 7 is an additional table that describes exemplary packet policers.

FIG. 8 is an additional table that describes exemplary packet policers.

FIG. 9 is an additional table that describes exemplary packet policers.

FIG. 10 is an additional table that describes exemplary packet policers.

Figure 1:
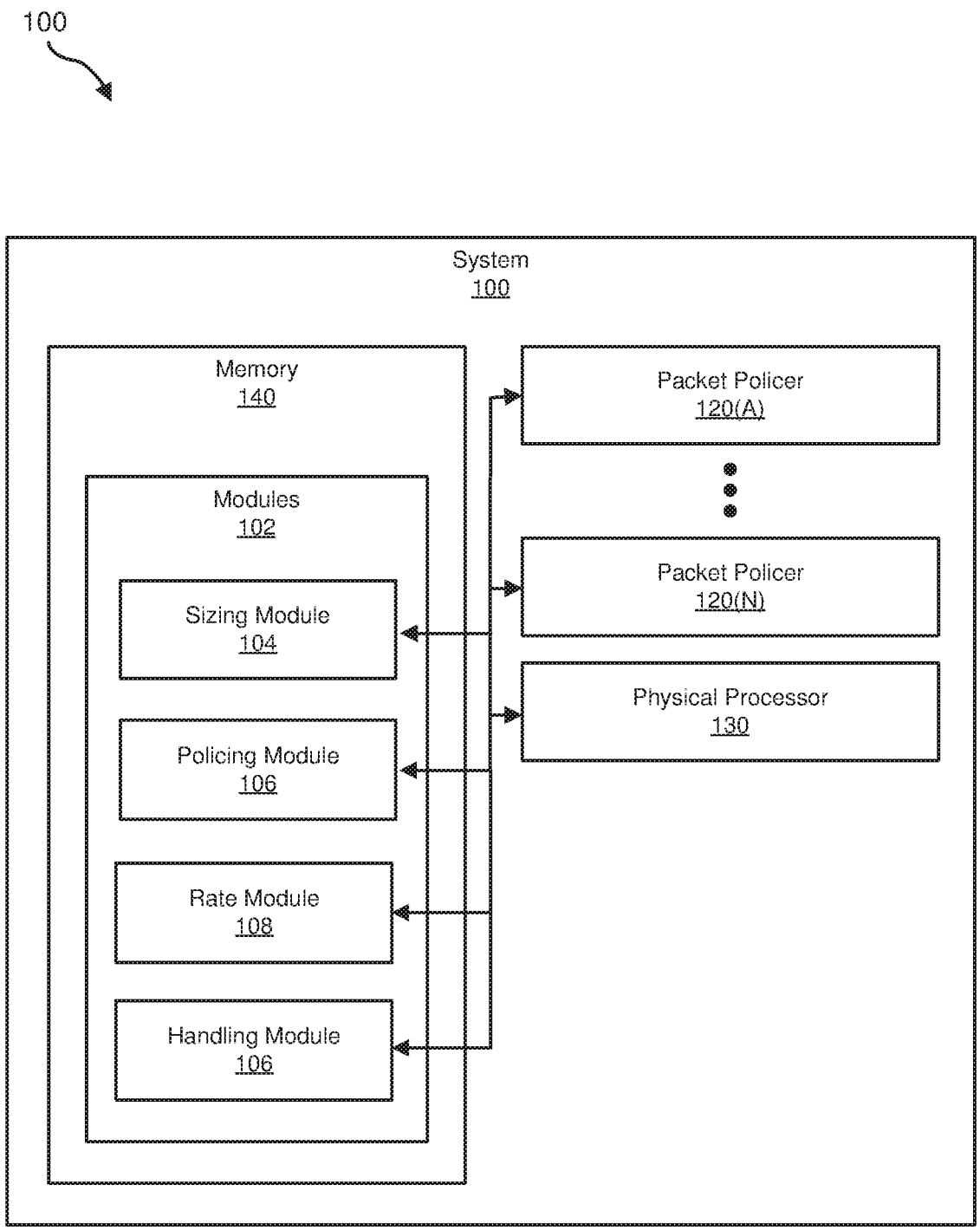
FIG. 1 is a block diagram of an exemplary system for policing network traffic rates.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure describes various systems and methods for policing network traffic rates. Embodiments of the instant disclosure may control rates at which a network resource receives and/or handles packets of various sizes. For example, embodiments of the disclosed traffic policing systems may implement multiple packet policers (e.g., multiple sub-policers) at a network device. Each packet policer may be tasked with policing traffic with a particular (e.g., different) range of sizes. In the event of a DoS attack (or similar type of attack, such as a distributed DoS (DDoS) attack, a peer-to-peer attack, a teardrop attack, and the like), the packet policers may prevent illegitimate packets from overloading the network device while ensuring that legitimate packets are able to be received and processed.

Some embodiments of the instant disclosure may dynamically update one or more settings of a group of packet policers. For example, a traffic policing system may record the average rate of packets tracked by each packet policer for a period of time. Based on this information, the traffic policing system may adjust parameters such as the rate or threshold at which the packet policers discard packets and/or the range of packet sizes tracked by the packet policers. As such, the packet policers may be optimized to handle fluctuations in both legitimate and illegitimate network traffic loads. For example, a packet policer may automatically begin restricting the rate at which a network device receives packets of a certain size in response to detecting an unexpected increase in the volume of such packets, thereby mitigating the effects of a potential DoS attack.

By policing the rates at which a computing device processes packets of various sizes, the disclosed systems and methods may protect the health and security of the computing device. These systems and methods may also dynamically balance legitimate traffic handled by the computing device, thereby optimizing the ability of the device to provide network-based services to users and other devices.

Figure 2:
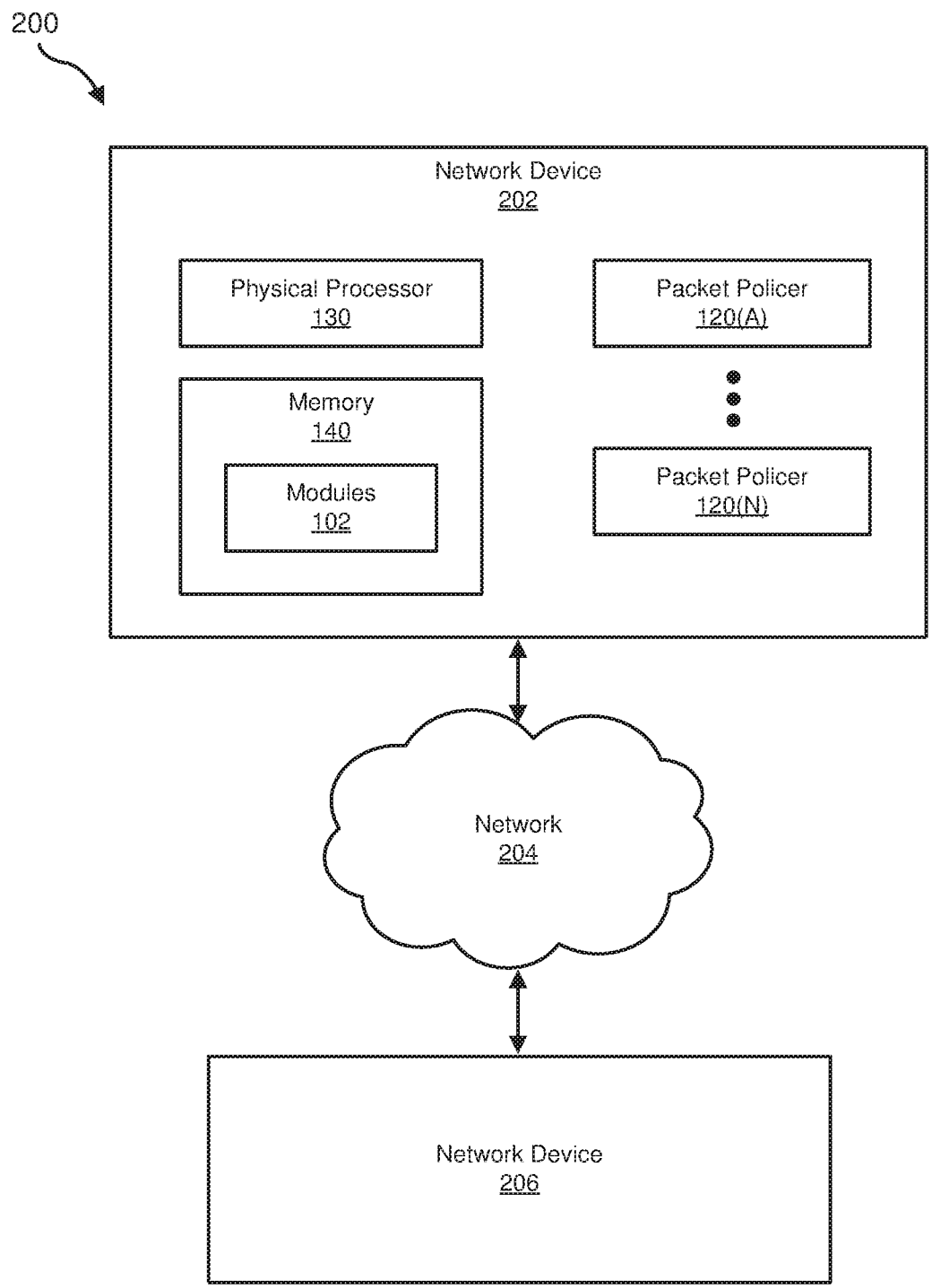
FIG. 2 is a block diagram of an additional exemplary system for policing network traffic rates.
Figure 3:
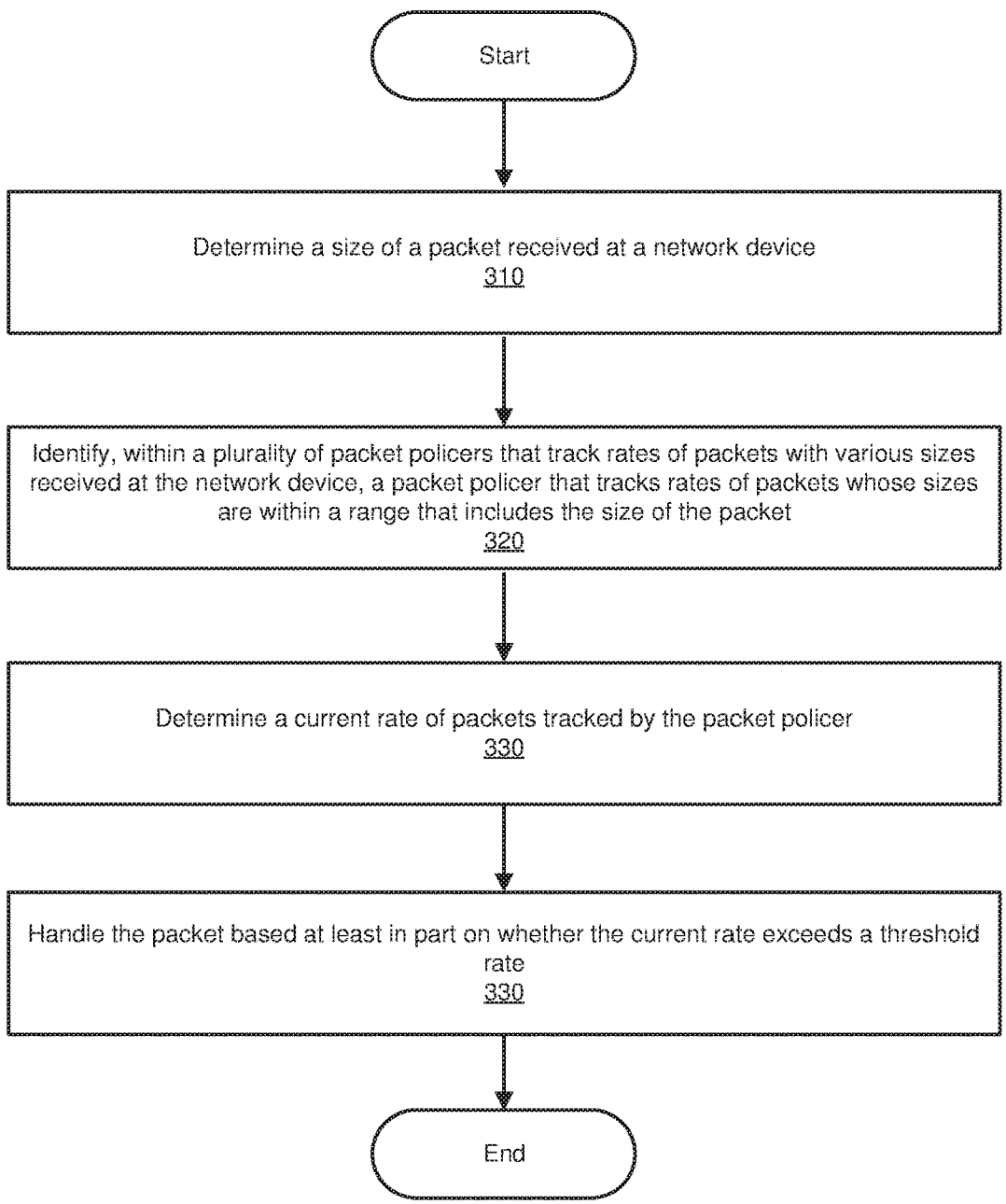
FIG. 3 is a flow diagram of an exemplary method for policing network traffic rates.
Figure 4:
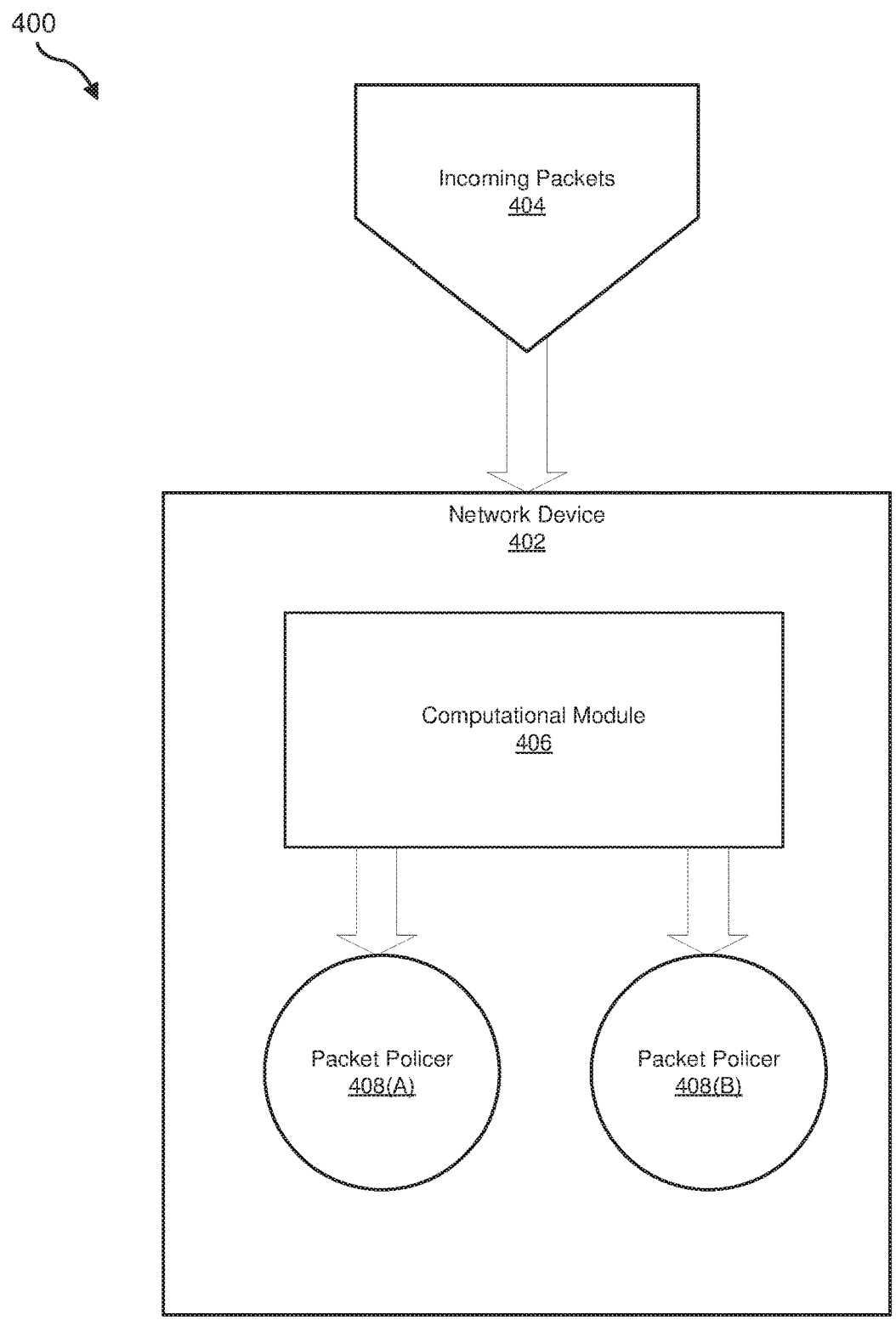
FIG. 4 is a block diagram of an additional exemplary system for policing network traffic rates.

The following will provide, with reference to FIGS. 1, 2, and 4, detailed descriptions of exemplary systems for policing network traffic rates. Detailed descriptions of exemplary packet policers will be provided in connection with FIGS. 5-10. Detailed descriptions of corresponding computer-implemented methods will be provided in connection with FIGS. 3 and 11. In addition, detailed descriptions of an exemplary computing system for carrying out these methods will be provided in connection with FIG. 12.

FIG. 1 is a block diagram of an exemplary system 100 for policing network traffic rates. As illustrated in this figure, exemplary system 100 may include one or more modules 102 for performing one or more tasks. As will be explained in greater detail below, modules 102 may include a sizing module 104, a policing module 106, a rate module 108, and a handling module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., network device 202 and/or network device 206). In addition, one or more of modules 102 may perform any of the functionality described herein in connection with any of the devices illustrated in FIG. 2. One or more of modules 102 in FIG. 1 may also represent all or portions of one or more special-purpose computers configured to perform one or more tasks.

As illustrated in FIG. 1, system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate policing network traffic rates. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, system 100 may also include one or more packet policers, such as packets policers 120(A)-120(N). The term "packet policer," as used herein, generally refers to any type or form of program, filter, and/or module that controls the rate at which certain network traffic is handled by a network device. A packet policer may be implemented within any suitable portion of a network device, including a network stack, a forwarding engine, and/or a routing engine. Moreover, a packet policer may be implemented via software and/or hardware.

In some examples, packet policers 120(A)-(N) may record information about all or a portion of the packets forwarded to a network device. For example, packet policers 120(A)-(N) may track rates of incoming packets whose sizes fall within various size ranges. In one embodiment, each of packet policers 120(A)-(N) may track a separate range of packet sizes. In the event that the rate of packets tracked by a particular packet policer exceeds a threshold rate, the packet policer may discard incoming packets (e.g., instead of forwarding the packets to a network interface or other intended destination of the packets). In this way, the packet policers may detect, prevent, and/or mitigate DoS attacks or similar types of attacks. As will be explained in greater detail below, one or more parameters of packet policers 120(A)-(N) may be dynamically adjusted based on current rates of packets tracked by the packet policers. As such, packet policers 120(A)-(N) may efficiently adapt to changes in both legitimate and illegitimate network traffic loads.

Exemplary system 100 in FIG. 1 may be implemented in a variety of ways. For example, all or a portion of exemplary system 100 may represent portions of exemplary system 200 in FIG. 2. As shown in FIG. 2, system 200 may include a network device 202 in communication with a network device 206 via a network 204. In one example, all or a portion of the functionality of modules 102 may be performed by network device 202, network device 206, and/or any other suitable computing system. As will be described in greater detail below, one or more of modules 102 from FIG. 1 may, when executed by at least one processor of network device 202, enable network device 202 to police rates of network traffic directed to network device 202.

Network devices 202 and 206 generally represent any type or form of computing devices that facilitate communication within a network and/or across networks. In some examples, network devices 202 and/or 206 may include and/or represent physical computing devices. In other examples, network devices 202 and/or 206 may include and/or represent virtual (e.g., software-based) computing devices that are hosted by one or more physical computing devices. In one embodiment, network devices 202 and 206 may host and/or facilitate the operation of a network resource (such as a website, application, server, etc.) that may be the target of a DoS attack or similar attack. Examples of network devices 202 and/or 206 include, without limitation, routers (such as a customer edge router, a provider edge router, a hub router, a spoke router, an autonomous system boundary router, and/or an area border router), switches, hubs, modems, bridges, repeaters, gateways, multiplexers, network adapters, network interfaces, servers, portions of one or more of the same, combinations or variations of one or more of the same, and/or any other suitable computing device.

Network 204 generally represents any medium or architecture capable of facilitating communication or data transfer via one or more network protocols. In one example, network 204 may facilitate communication between network device 202 and network device 206. Network 204 may facilitate communication or data transfer using wireless and/or wired connections. Examples of network 204 include, without limitation, a Wide Area Network (WAN), a Local Area Network (LAN), a Personal Area Network (PAN), the Internet, Power Line Communications (PLC), a cellular network (e.g., a Global System for Mobile Communications (GSM) network), a resource RSVP-TE network, portions of one or more of the same, variations or combinations of one or more of the same, and/or any other suitable network. Although illustrated as being external to network 204 in FIG. 2, network device 202 and network device 206 may each represent a portion of network 204 and/or be included in network 204.

FIG. 3 is a flow diagram of an example computer-implemented method 300 for policing rates of network traffic. The steps shown in FIG. 3 may be performed by any suitable computer-executable code and/or computing system, including system 100 in FIG. 1, system 200 in FIG. 2, and/or system 400 in FIG. 4. In one example, each of the steps shown in FIG. 3 may represent an algorithm whose structure includes and/or is represented by multiple substeps, examples of which will be provided in greater detail below.

As illustrated in FIG. 3, at step 310 one or more of the systems described herein may determine a size of a packet received at a network device. For example, sizing module 104 may, as part of network device 202 in FIG. 2, determine a size of a packet received at network device 202.

The systems described herein may perform step 310 in a variety of ways and/or contexts. In some examples, sizing module 104 may monitor network device 202 to detect incoming packets forwarded to network device 202. Sizing module 104 may detect any type or form of incoming packets (e.g., packets forwarded via any type or form of protocol). In addition, sizing module 104 may detect packets intermediately destined for network device 202, as well as packets whose final intended destination is network device 202. In some embodiments, sizing module 104 may intercept all or a portion of the packets directed to network device 202 before the packets are processed by network device 202 (e.g., before the packets are sent to and/or handled by a port, network interface, network stack, forwarding engine, routing engine, and/or other component of network device 202). In this way, the disclosed systems may determine whether to discard the packet (e.g., in order to mitigate a potential DoS attack) before network device 202 utilizes bandwidth and/or computing resources to process the packets.

After intercepting an incoming packet, sizing module 104 may determine the size of the packet. For example, sizing module 104 may determine the number of bytes of data included within the packet. Specifically, sizing module 104 may determine the total length of the packet, including the size of the packet's payload, the size of the headers of the packet, and/or the size of any additional component of the packet. In one embodiment, sizing module 104 may extract this information from a header (e.g., an Internet Protocol (IP) header) of the packet. Sizing module 104 may determine the size of a packet in any additional or alternative manner.

Returning to FIG. 3, at step 320 one or more of the systems described herein may identify, within a plurality of packet policers that track rates of packets with various sizes received at the network device, a packet policer that tracks rates of packets whose sizes are within a range that includes the size of the packet. For example, policing module 106 may, as part of network device 202 in FIG. 2, identify, within packet policers 120(A)-(N), a packet policer that tracks rates of packets whose sizes are within a range that includes the size of the packet.

The systems described herein may perform step 320 in a variety of ways and/or contexts. In some examples, policing module 106 may select an appropriate packet policer to track and/or handle a packet based on the size of the packet. For example, network device 202 may implement and/or operate multiple packet policers. Each of these packet policers may be assigned to and/or associated with a particular (e.g., different) range of packet sizes. Accordingly, policing module 106 may match an incoming packet with a packet policer that has been assigned to and/or associated with a range of packet sizes that includes the size of the incoming packet. After matching the incoming packet with the packet policer, policing module 106 may forward the packet to the packet policer. For example, policing module 106 may send, to a database that records rates of packets detected at network device 202, an indication that the incoming packet was detected, as well as the size of the packet. The database may update a counter that indicates the number and/or rate of packets whose sizes are within the size range associated with the packet policer that have been recently detected at network device 202 (e.g., detected within the last 1 second, 10 seconds, 100 seconds, etc.).

As an example, FIG. 4 illustrates an exemplary system 400 that includes a network device 402. In this example, network device 402 may include a computational module 406 (corresponding to all or a portion of modules 102) that receives incoming packets 404 as incoming packets 404 are sent to network device 402. In some embodiments, computational module 406 may determine that an incoming packet is to be tracked by a particular packet policer (e.g., either packet policer 408(A) or packet policer 408(B)) implemented within network device 402. Computational module 406 may then send, to the packet policer, an indication that the packet was detected.

In one embodiment, the total range of packet sizes tracked by both packet policers 408(A) and 408(B) may contiguously include the size of each packet that may be received at network device 402. For example, the total range of packet sizes may begin at the size of the smallest packet capable of being forwarded to network device 402 and end at the size of the largest packet capable of being forwarded to network device 402 (e.g., the maximum transmission unit (MTU) value of network device 402). As an example, in the event that the MTU of network device 402 is 1500 bytes, packet policer 408(A) may track rates of packets whose sizes are between 0 and 750 bytes and packet policer 408(B) may track rates of packets whose sizes are between 751 and 1500 bytes. In this example, computational module 406 may forward an incoming packet to either packet policer 408(A) or packet policer 408(B) based on whether the size of the packet is greater than or less than 750 bytes. As will be explained in greater detail below, the range of packet sizes tracked by an individual packet policer within a network device may be selected and/or adjusted in a variety of ways.

Returning to FIG. 3, at step 330 one or more of the systems described herein may determine a current rate of packets tracked by the packet policer. For example, rate module 108 may, as part of network device 202 in FIG. 2, determine a current rate of packets tracked by one or more of packet policers 120(A)-(N).

The systems described herein may perform step 330 in a variety of ways and/or contexts. In some examples, rate module 108 may determine the current rate of packets tracked by a packet policer by querying and/or searching a database utilized by the packet policer to record rates of incoming packets. For example, the database may indicate the rate and/or number of packets tracked by the packet policer within a certain time interval (e.g., 1 second, 10 seconds, 100 seconds, etc.). In one embodiment, the database may indicate the average rate of packets that have been detected between the beginning of the time interval and the current point in time. This average may be a simple average, a weighted average, an exponentially moving average, or any other suitable type of average.

FIG. 5 illustrates a table 502 that describes exemplary rates of packets tracked by packet policers 408(A) and 408(B) of network device 402 in FIG. 4. In this example, packet policer 1 (corresponding to packet policer 408(A)) may track, on average, 2500 packets per second during a particular 100 second period. During this same period, packet policer 2 (corresponding to packet policer 408(B)) may track, on average, 2000 packets per second.

Returning to FIG. 3, at step 340 one or more of the systems described herein may handle the packet based at least in part on whether the current rate exceeds a threshold rate. For example, handling module 110 may, as part of network device 202 in FIG. 2, handle the packet based at least in part on whether the current rate exceeds a threshold rate.

The systems described herein may perform step 340 in a variety of ways and/or contexts. In some examples, a packet policer may implement a threshold rate of packets that are allowed to be processed by network device 202. This threshold rate may correspond to and/or control the maximum rate of packets of a certain size (or within a certain size range) that are permitted to utilize the bandwidth and/or computing resources available to network device 202. As will be explained in greater detail, the threshold rate may be selected to prevent and/or mitigate DoS attacks and similar attacks while ensuring that legitimate packets are not disproportionately and/or unduly discarded.

In some embodiments, handling module 110 may compare the threshold rate implemented by a packet policer with the current rate of packets tracked by the packet policer. In the event that the current rate is less than or equal to the threshold rate, handling module 110 may direct network device 202 to process an incoming packet normally (e.g., handling module 110 may forward the packet to a network interface, port, or other intended destination of the packet within network device 202). In the event that the current rate exceeds the threshold rate, handling module 110 may discard the packet. For example, handling module 110 may delete, drop, or otherwise remove the packet from network device 202 such that the packet does not consume the bandwidth and/or computing resources available to network device 202. In the event that the packet was directed to network device 202 as part of a DoS attack or similar attack, discarding the packet may prevent and/or mitigate the attack. In some embodiments, handling module 110 may forward the packet to a security service (e.g., a security service hosted on a remote server) that determines whether the packet is malicious or legitimate.

In some examples, a packet policer may implement a burst-size limit in addition to or instead of a threshold rate. The term "burst-size limit," as used herein, generally refers to any type or form of size and/or bandwidth buffer. For example, a burst-size limit may correspond to and/or control the number of bytes that a packet policer permits to be processed by a network device (e.g., at a single point in time or within a certain time interval). As an example, a packet policer may implement a threshold rate of 2000 packets per second and a burst-size limit of 4000 bytes within 20 milliseconds. In this example, the packet policer may allow up to 4000 bytes of packets to be processed within a period of 20 milliseconds (e.g., even if the current rate of packets exceeds 2000 packets per second). In some embodiments, a burst-size limit may enable a network device to handle so-called bursty traffic (e.g., legitimate traffic forwarded to the network device at an unexpectedly high rate for a short period of time). In the event that a packet policer implements a burst-size limit, handling module 110 may determine whether to discard an incoming packet or direct network device 202 to process the incoming packet based at least in part on the burst-size limit.

In some embodiments, the systems described herein may dynamically update one or more parameters of the packet policers of a network device. For example, policing module 106 may periodically update the range of packet sizes tracked by one or more packet policers. Additionally or alternatively, policing module 106 may periodically update the threshold rate and/or burst-size limit implemented by one or more packet policers. In some embodiments, policing module 106 may update a parameter of a particular packet policer based on an average rate of packets tracked by the packet policer during a certain time interval and/or an average rate of packets tracked by one or more additional packet policers during the certain time interval.

FIG. 6 describes various ways in which the disclosed systems may update the threshold rate implemented by two packet policers of a network device. In this example, policing module 106 may update the threshold rate of each packet policer such that the number and/or percentage of packets that exceed the threshold rate of one packet policer is expected to equal (or approximately equal) the number and/or percentage of packets that exceed the threshold rate of the other packet policer. For example, policing module 106 may determine and/or assume that the average rates of packets tracked by each packet policer during a first time interval is expected to equal (or approximately equal) the average rates of packets that will be tracked by the packet policers during a subsequent time interval (e.g., a time interval immediately following the first time interval). Thus, policing module 106 may calculate, based on historical data about the average rate of packets tracked by each packet policer during the first time interval, an adjustment to one or both threshold rates that is expected to result in balanced (e.g., matching) rates of packets discarded by the packet policers. This adjustment scheme may help ensure that legitimate packets tracked by both packet policers are discarded at a proportional, corresponding, or otherwise fair rate.

In one embodiment, packet policer 1 and packet policer 2 in FIG. 6 may correspond, respectively, to packet policer 408(A) and packet policer 408(B) of network device 402 in FIG. 4. As discussed in connection with FIG. 5, during a certain time interval, packet policer 1 may record an average rate of 2500 packets per second and packet policer 2 may record an average rate of 2000 packets per second. In the examples of FIG. 6, policing module 106 may update the threshold rate implemented by each packet policer based on both these tracked packet rates and a desired total threshold rate (e.g., a threshold rate for all packets processed by network device 402). In one example, policing module 106 may adjust the thresholds using the following formulas:

$$r_1 = R \frac{p_1}{p_1 + p_2}$$

and $$r_2 = R \frac{p_2}{p_1 + p_2},$$

where $r_1$ is the adjusted threshold rate for packet policer 1, $r_2$ is the adjusted threshold rate for packet policer 2, R is the total threshold rate, $p_1$ is the packet rate tracked by packet policer 1, and $p_2$ is the packet rate tracked by packet policer 2. Policing module 106 may use any additional or alternative formulas, including formulas that have been adjusted to account for more than two packet policers.

Table 602 of FIG. 6 illustrates the adjusted packet rates for packet policers 1 and 2 in the event that the total threshold rate is 4500 packets per second. Because the total rate of tracked packets equals this total threshold rate, the adjusted threshold rates may simply correspond to the tracked packet rates. Table 604 illustrates the adjusted packet rates for packet policers 1 and 2 in the event that the total threshold rate is 4000 packets per second. Because this total threshold rate is less than the total rate of tracked packets, the adjusted threshold rates may be less than the tracked packet rates. In addition, table 606 illustrates the adjusted packet rates for packet policers 1 and 2 in the event that the total threshold rate is 5000 packets per second. Because this total threshold rate is greater than the total rate of tracked packets, the adjusted threshold rates may be greater than the tracked packet rates.

FIG. 7 illustrates additional ways in which the disclosed systems may update the threshold rate of packet policers 1 and 2 shown in FIGS. 5 and 6. In this example, policing module 106 may update the threshold rates based at least in part on a bias assigned to one or both packet policers. In one embodiment, policing module 106 may positively bias a packet policer by allocating a higher threshold rate to the packet policer (e.g., compared to the threshold rate calculated in the manner discussed in connection with FIG. 6). Alternatively, policing module 106 may negatively bias the packet policer by allocating a lower threshold rate to the packet policer. Policing module 106 may bias a packet policer in response to a variety of factors and/or contexts. In one example, policing module 106 may positively bias a packet policer in response to determining that an unexpectedly high number of legitimate packets were discarded by the packet policer during a previous time interval. In another example, policing module 106 may negatively bias a packet policer in response to determining that an unexpectedly high number of suspicious or illegitimate packets were tracked by the packet policer during the previous monitoring time interval.

Table 702 of FIG. 7 illustrates adjusted threshold rates for packet policers 1 and 2 when the total threshold rate is 4500 packets per second and packet policer 1 has been negatively biased by 5%. In this example, policing module 106 may calculate the threshold rate for packet policer 1 by reducing the threshold rate of packet policer 1 shown in table 602 by 5%. In addition, policing module 106 may calculate the threshold rate for packet policer 2 by increasing the threshold rate of packet policer 2 shown in table 602 by an amount corresponding to the reduction of the threshold rate for packet policer 1. Policing module 106 may select any appropriate bias for a packet policer (e.g., −10%, 15%, etc.). Moreover, policing module 106 may calculate a biased threshold rate in any additional or alternative manner.

FIG. 8 describes additional ways in which the disclosed systems may update the threshold rate of packet policers 1 and 2 shown in FIGS. 5-7. In this example, policing module 106 may update the threshold rates of packet policers 1 and 2 based at least in part on a keep-aside percentage. In some embodiments, the term "keep-aside percentage" may refer to an amount or ratio of the total threshold rate that is not initially allocated to any packet policer within a network device. For example, when implementing a keep-aside percentage, policing module 106 may calculate initial threshold rates for a group of packet policers based on a total threshold rate that is less than the actual total threshold rate by an amount corresponding to the keep-aside percentage. In other words, policing module 106 may reserve a portion of the total threshold rate. Policing module 106 may then allocate the reserved portion to the packet policers in accordance with various allocation schemes.

In the example of FIG. 8, policing module 106 may calculate the initial threshold rates for packet policers 1 and 2 using the following formulas:

$$\frac{r_1'}{r_2'} = \frac{p_1}{p_2}$$

and $r_1'+r_2'=R-K$, where $r_1'$ is the initial threshold rate for packet policer 1, $r_2'$ is the initial threshold rate for packet policer 2, $p_1$ is the packet rate tracked by packet policer 1, $p_2$ is the packet rate tracked by packet policer 2, R is the total threshold rate, and K is the reserved portion of the total threshold rate. In the examples of FIG. 8, the total threshold rate may be 4000 packets per second and the keep-aside percentage may be 20%. In these examples, $r_1'$ may be 1778 packets per second and the $r_2'$ may be 1422 packets per second. These initial threshold rates may be calculated using any additional or alternative formula. For example, policing module 106 may implement a different formula in the event that the total tracked packet rate exceeds the total threshold rate and/or in the event that network device 402 implements more than two packet policers.

Table 802 of FIG. 8 illustrates exemplary threshold rates for packet policers 1 and 2 calculated based on an equal keep-aside allocation scheme. In this example, policing module 106 may split the reserved portion of the total threshold rate (e.g., 800 packets per second) equally between packet policer 1 and packet policer 2. Thus, policing module 106 may increase both of the initial threshold rates by 400 packets per second. In some embodiments, policing module 106 may implement this allocation scheme in the event that the rates of packets tracked by packet policers 1 and 2 are the same or similar and/or in the event that no evidence of a DoS attack has been detected.

Table 804 of FIG. 8 illustrates exemplary threshold rates for packet policers 1 and 2 calculated based on an inversely-proportional-to-packet-rate keep-aside allocation scheme. In this example, policing module 106 may split the reserved portion of the total threshold rate using the following formulas:

$$\frac{k_1}{k_2} = \frac{p_2}{p_1}$$

and $k_1+k_2=K$, where $k_1$ is the keep-aside portion allocated to packet policer 1, $k_1$ is the keep-aside portion allocated to packet policer 2, $p_1$ is the packet rate tracked by packet policer 1, $p_2$ is the packet rate tracked by packet policer 2, and K is the total keep-aside portion of the total threshold rate. In the example of FIG. 8, $k_1$ may be 356 packets per second and $k_2$ may be 444 packets per second. In some embodiments, policing module 106 may implement this allocation scheme in the event that a potential DoS attack or similar attack has been detected. For example, policing module 106 may determine that network device 402 is potentially experiencing a DoS attack that involves packets sized between 0 and 750 bytes based on the rate of packets tracked by packet policer 1 exceeding the rate of packets tracked by packet policer 2. Thus, implementing the inversely proportional keep-aside allocation scheme may prevent packets sized between 0 and 750 bytes from overloading network device 402.

Table 806 of FIG. 8 illustrates exemplary threshold rates for packet policers 1 and 2 calculated based on a proportional-to-policer-range keep-aside allocation scheme. In this example, policing module 106 may split the reserved portion of the total threshold rate using the following formulas:

$$\frac{k_1}{k_2} = \frac{l_1}{l_2}$$

and $k_1+k_2=K$, where $k_1$ is the keep-aside portion allocated to packet policer 1, $k_2$ is the keep-aside portion allocated to packet policer 2, $l_1$ is the length of the packet size range tracked by packet policer 1, $l_2$ is the length of the packet size range tracked by packet policer 2, and K is the total keep-aside portion of the total threshold rate. In this example, packet policer 1 may track rates of packets whose sizes are between 0 and 500 bytes and packet policer 2 may track rates of packets whose sizes are between 501 and 1500 bytes. Thus, $k_1$ may be 267 packets per second and $k_2$ may be 533 packets per second. In some embodiments, policing module 106 may implement this allocation scheme in the event that the length of the packet size ranges tracked by the packet policers of a network device are not the same (e.g., the lengths are different by at least a certain amount).

In addition to or instead of adjusting the threshold rate of a packet policer, policing module 106 may dynamically adjust a burst-size limit of the packet policer. For example, policing module 106 may determine a total burst-size limit for all the packets processed by network device 402. Policing module 106 may then allocate a portion of the total burst-size limit to each packet policer of network device 402. In some embodiments, policing module 106 may track the burst usage of the packet policers (e.g., the percentage and/or amount of a burst-size buffer used by the packet policers) during a certain time interval. Policing module 106 may then adjust the burst-size limits of the packet policers in accordance with any of the threshold-rate-adjustment schemes discussed above. For example, policing module 106 may adjust the burst-size limit of packet policers 1 and 2 such that the burst-size limit usage of packet policer 1 corresponds to (e.g., equals or approximately equals) the burst-size limit usage of packet policer 1 (e.g., in accordance with the adjustment scheme discussed in connection with FIG. 6). In other examples, policing module 106 may adjust the burst-size limits of the packet policers based on a particular bias and/or keep-aside allocation scheme (e.g., as discussed in connection with FIGS. 7 and 8). Policing module 106 may adjust the burst-size limits of one or more packet policers in any additional or alternative manner.

Furthermore, in some embodiments, policing module 106 may dynamically adjust the range of packet sizes tracked by one or more packet policers. For example, policing module 106 may increase or decrease the length of the packet size range tracked by a packet policer to help ensure that the packet rate tracked by the packet policer equals (or approximately equals) the packet rate tracked by one or more additional packet policers. In some embodiments, policing module 106 may determine the rate and/or number of packets tracked by each packet policer within a network device for a certain time interval. Policing module 106 may then provide this information to a partitioning algorithm that selects appropriate packet size ranges.

FIG. 9 illustrates a table 902 that describes exemplary packet rates tracked by a traffic policing system that includes 8 packet policers (e.g., packet policers 1-8). As shown in FIG. 9, some packet policers (such as packet policers 2, 3, and 6) may record relatively high rates of packets during a certain time interval. Other packet policers (such as packet policers 4, 5, and 8) may record relatively low rates of packets during the time interval. To help ensure that packet policers 1-8 do not disproportionately discard legitimate packets of certain sizes, policing module 106 may provide the information shown in table 902 to a partitioning algorithm that normalizes the distribution of packets tracked by each packet policer. FIG. 10 illustrates an exemplary embodiment of the output of this partitioning algorithm. In this example, the partitioning algorithm may condense the 8 packet policers shown in FIG. 9 to 3 packet policers. Each of these 3 packet policers may be expected to record approximately 3000 packets per second.

While FIG. 10 illustrates condensing multiple packet policers into a single packet policer, in some embodiments, a partitioning algorithm may divide a single packet policer into more than one packet policer. For example, policing module 106 may provide, to the partitioning algorithm, input indicating the maximum threshold rate of an individual packet policer. In the event that a certain existing packet policer exceeds this threshold, the partitioning algorithm may split the packet policer into smaller packet policers that each conform to the threshold. In some embodiments, a partitioning algorithm may monitor subsections of the packet size range tracked by a packet policer to maximize and/or improve the results of the algorithm. Moreover, in some examples, the total number of packet policers implemented within a packet policing system may be set or determined by a user or administrator. Alternatively, an optimal number of packet policers may be dynamically and/or automatically discovered (e.g., by a machine learning algorithm). The disclosed systems may implement a machine learning algorithm to optimize and/or select any additional parameter of a packet policer, such as the threshold rate of the packet policer and/or the keep-aside allocation scheme used to determine the threshold rate.

Figure 11:
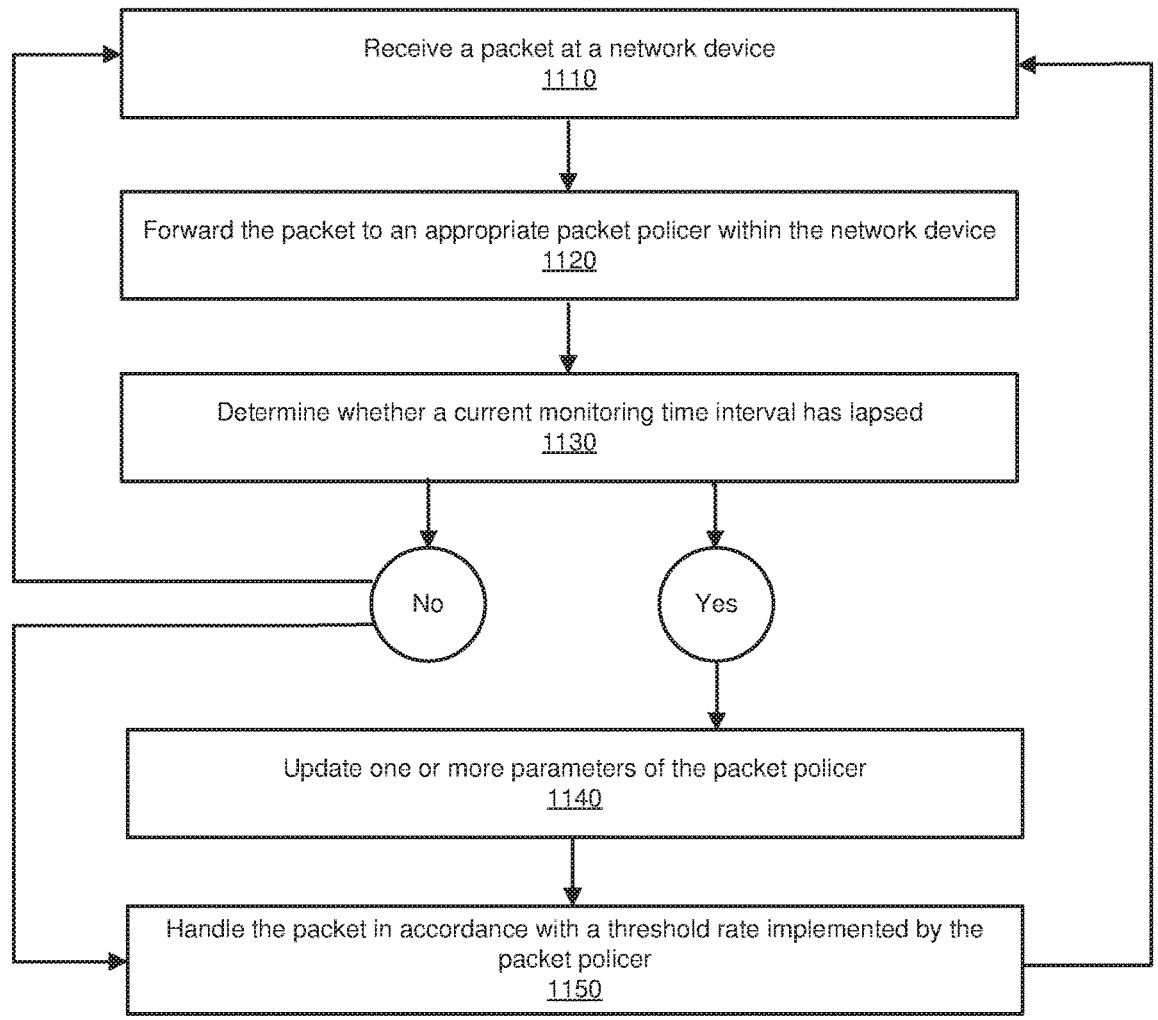
FIG. 11 is a flow diagram of an additional exemplary method for policing network traffic rates.

FIG. 11 is a flow diagram of an example computer-implemented method 1100 for policing network traffic rates. In particular, method 1100 describes an exemplary process for dynamically and periodically adjusting parameters of a set of packet policers implemented at a network device. The steps shown in FIG. 11 may be performed by any suitable computer-executable code and/or computing system, including system 100 in FIG. 1, system 200 in FIG. 2, and/or system 400 in FIG. 4. In one example, each of the steps shown in FIG. 11 may represent an algorithm whose structure includes and/or is represented by multiple sub-steps, examples of which will be provided in greater detail below.

As shown in FIG. 11, at step 1110, a traffic policing system may receive a packet at a network device. For example, the traffic policing system may detect an incoming packet forwarded to the network device and intercept the packet before the packet is processed and/or handled by a network interface or other component of the network device.

At step 1120, the traffic policing system may forward the packet to an appropriate packet policer within the network device. For example, the traffic policing system may determine the size of the packet and then select a packet policer that tracks rates of packets whose sizes are within a range that includes the size of the packet. The traffic policing system may send the packet to the packet policer such that the packet policer may update a current rate and/or number of packets received at the network device whose sizes are within the range.

At step 1130, the traffic policing system may determine whether a current monitoring time interval has lapsed. For example, the traffic policing system may monitor rates of packets tracked by the packet policers of the network device for a certain period of time (e.g., 10 seconds, 50 seconds, 100 seconds, 150 seconds, etc.). In the event that the current monitoring time interval has not lapsed, method 1100 may return to step 1110 (e.g., the traffic policing system may monitor the network device for additional incoming packets). In addition, method 1100 may proceed to step 1150. At step 1150, the traffic policing system may handle the packet in accordance with a threshold rate and/or a burst-size limit implemented by the packet policer. For example, the traffic policing system may determine, based at least in part on a comparison between the current rate of packets tracked by the packet policer and the threshold rate, whether to discard the packet or direct the network device to process the packet.

In the event that the traffic policing system determines that the current monitoring time interval has lapsed at step 1130, method 1100 may proceed to step 1140. At step 1140, the traffic policing system may update one or more parameters of all or portion of the packet policers implemented at the network device. For example, the traffic policing system may adjust the threshold rates, burst-size limits, and/or packet range sizes of the packet policers. The traffic policing system may adjust any number or combination of these parameters. For example, the traffic policing system may adjust each parameter after the current monitoring time interval has lapsed and then adjust a single parameter after a subsequent monitoring time interval has lapsed. In addition, the threshold rates and/or burst-size limits may be adjusted in accordance with any suitable adjustment scheme (e.g., an adjustment scheme selected by a network administrator and/or a machine learning algorithm).

After one or more parameters of the packet policers have been adjusted, method 1100 may proceed to step 1150. Following completion of step 1150 (e.g., handling the incoming packet), method 1100 may repeat. For example, the traffic policing system may begin a new monitoring cycle. In this way, the traffic policing system may dynamically update the parameters of the packet policers in real-time to account for changes in both legitimate and illegitimate network loads.

Computing system 1200 broadly represents any type or form of electrical load, including a single or multi-processor computing device or system capable of executing computer-readable instructions. Examples of computing system 1200 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 1200 may be programmed, configured, and/or otherwise designed to comply with one or more networking protocols. According to certain embodiments, computing system 1200 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 1200 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 1200 may include various network and/or computing components. For example, computing system 1200 may include at least one processor 1214 and a system memory 1216. Processor 1214 generally represents any type or form of processing unit capable of processing data or interpreting and executing instructions. For example, processor 1214 may represent an application-specific integrated circuit (ASIC), a system on a chip (e.g., a network processor), a hardware accelerator, a general purpose processor, and/or any other suitable processing element.

Processor 1214 may process data according to one or more of the networking protocols discussed above. For example, processor 1214 may execute or implement a portion of a protocol stack, may process packets, may perform memory operations (e.g., queuing packets for later processing), may execute end-user applications, and/or may perform any other processing tasks.

System memory 1216 generally represents any type or form of volatile or non-volatile storage device or medium capable of storing data and/or other computer-readable instructions. Examples of system memory 1216 include, without limitation, Random Access Memory (RAM), Read Only Memory (ROM), flash memory, or any other suitable memory device. Although not required, in certain embodiments computing system 1200 may include both a volatile memory unit (such as, for example, system memory 1216) and a non-volatile storage device (such as, for example, primary storage device 1232, as described in detail below). System memory 1216 may be implemented as shared memory and/or distributed memory in a network device. Furthermore, system memory 1216 may store packets and/or other information used in networking operations.

Figure 12:
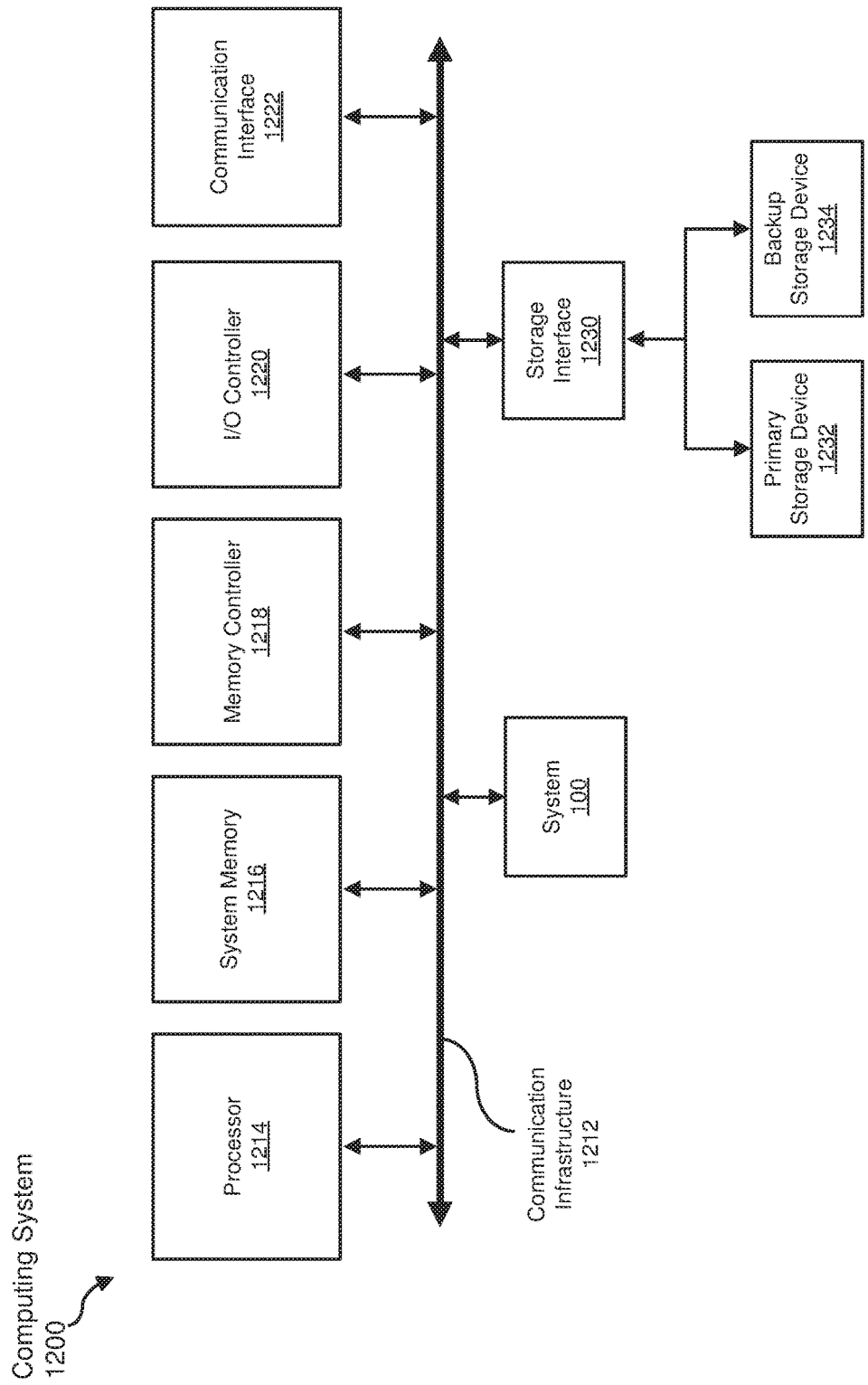
FIG. 12 is a block diagram of an exemplary computing system capable of implementing and/or being used in connection with one or more of the embodiments described and/or illustrated herein.

In certain embodiments, exemplary computing system 1200 may also include one or more components or elements in addition to processor 1214 and system memory 1216. For example, as illustrated in FIG. 12, computing system 1200 may include a memory controller 1218, an Input/Output (I/O) controller 1220, and a communication interface 1222, each of which may be interconnected via communication infrastructure 1212. Communication infrastructure 1212 generally represents any type or form of infrastructure capable of facilitating communication between one or more components of a computing device. Examples of communication infrastructure 1212 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 1218 generally represents any type or form of device capable of handling memory or data or controlling communication between one or more components of computing system 1200. For example, in certain embodiments memory controller 1218 may control communication between processor 1214, system memory 1216, and I/O controller 1220 via communication infrastructure 1212. In some embodiments, memory controller 1218 may include a Direct Memory Access (DMA) unit that may transfer data (e.g., packets) to or from a link adapter.

I/O controller 1220 generally represents any type or form of device or module capable of coordinating and/or controlling the input and output functions of a computing device. For example, in certain embodiments I/O controller 1220 may control or facilitate transfer of data between one or more elements of computing system 1200, such as processor 1214, system memory 1216, communication interface 1222, and storage interface 1230.

Communication interface 1222 broadly represents any type or form of communication device or adapter capable of facilitating communication between exemplary computing system 1200 and one or more additional devices. For example, in certain embodiments communication interface 1222 may facilitate communication between computing system 1200 and a private or public network including additional computing systems. Examples of communication interface 1222 include, without limitation, a link adapter, a wired network interface (such as a network interface card), a wireless network interface (such as a wireless network interface card), and any other suitable interface. In at least one embodiment, communication interface 1222 may provide a direct connection to a remote server via a direct link to a network, such as the Internet. Communication interface 1222 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 1222 may also represent a host adapter configured to facilitate communication between computing system 1200 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1222 may also enable computing system 1200 to engage in distributed or remote computing. For example, communication interface 1222 may receive instructions from a remote device or send instructions to a remote device for execution.

As illustrated in FIG. 12, exemplary computing system 1200 may also include a primary storage device 1232 and/or a backup storage device 1234 coupled to communication infrastructure 1212 via a storage interface 1230. Storage devices 1232 and 1234 generally represent any type or form of storage device or medium capable of storing data and/or other computer-readable instructions. For example, storage devices 1232 and 1234 may represent a magnetic disk drive (e.g., a so-called hard drive), a solid state drive, a floppy disk drive, a magnetic tape drive, an optical disk drive, a flash drive, or the like. Storage interface 1230 generally represents any type or form of interface or device for transferring data between storage devices 1232 and 1234 and other components of computing system 1200.

In certain embodiments, storage devices 1232 and 1234 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1232 and 1234 may also include other similar structures or devices for allowing computer software, data, or other computer-readable instructions to be loaded into computing system 1200. For example, storage devices 1232 and 1234 may be configured to read and write software, data, or other computer-readable information. Storage devices 1232 and 1234 may be a part of computing system 1200 or may be separate devices accessed through other interface systems.

Many other devices or subsystems may be connected to computing system 1200. Conversely, all of the components and devices illustrated in FIG. 12 need not be present to practice the embodiments described and/or illustrated herein. The devices and subsystems referenced above may also be interconnected in different ways from those shown in FIG. 12. Computing system 1200 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
    determining a size of a packet received at a network device;
    identifying, within a plurality of packet policers that track rates of packets with various sizes received at the network device, a packet policer that tracks rates of packets whose sizes are within a range that includes the size of the packet;
    determining a current rate of packets tracked by the packet policer; and
    handling the packet based at least in part on whether the current rate exceeds a threshold rate.

2. The method of claim 1, further comprising determining:
    an average rate of packets tracked by the packet policer during a certain time interval; and
    an average rate of packets tracked by at least one additional packet policer within the plurality of packet policers during the certain time interval.

3. The method of claim 2, further comprising adjusting, based on the average rates of packets tracked by the packet policer and the additional packet policer during the certain time interval, the threshold rate such that a number of packets that exceed the adjusted threshold rate during a subsequent time interval corresponds to a number of packets that exceed an additional threshold rate implemented by the additional packet policer during the subsequent time interval.

4. The method of claim 2, further comprising adjusting, based on the average rates of packets tracked by the packet policer and the additional packet policer during the certain time interval, the threshold rate such that a number of packets that exceed the adjusted threshold rate during a subsequent time interval differs, by a certain amount, from a number of packets that exceed an additional threshold rate implemented by the additional packet policer during the subsequent time interval.

5. The method of claim 2, further comprising adjusting, based on the average rates of packets tracked by the packet policer and the additional packet policer during the certain time interval, the range of packet sizes tracked by the packet policer such that an average rate of packets tracked by the packet policer during a subsequent time interval corresponds to an average rate of packets tracked by the additional packet policer during the subsequent time interval.

6. The method of claim 2, further comprising adjusting, based on the average rates of packets tracked by the packet policer and the additional packet policer during the certain time interval, a burst-size limit implemented by the packet policer such that a number of packets that exceed the adjusted burst-size limit during a subsequent time interval corresponds to a number of packets that exceed an additional burst-size limit implemented by the additional packet policer during the subsequent time interval.

7. The method of claim 1, further comprising:
determining a total threshold rate for all packets tracked by the plurality of packet policers; and
allocating a portion of the total threshold rate to each of the plurality of packet policers.

8. The method of claim 1, further comprising:
detecting a potential denial-of-service (DoS) attack directed to the network device; and
lowering the threshold rate to mitigate the potential DoS attack.

9. The method of claim 1, wherein handling the packet comprises discarding the packet based at least in part the current rate of packets tracked by the packet policer exceeding the threshold rate.

10. The method of claim 1, wherein handling the packet comprises forwarding the packet to a network interface of the network device based at least in part on the current rate of packets tracked by the packet policer not exceeding the threshold rate.

11. A system comprising:
a sizing module, stored in memory, that determines a size of a packet received at a network device;
a policing module, stored in memory, that identifies, within a plurality of packet policers that track rates of packets with various sizes received at the network device, a packet policer that tracks rates of packets whose sizes are within a range that includes the size of the packet;
a rate module, stored in memory, that determines a current rate of packets tracked by the packet policer;
a handling module, stored in memory, that handles the packet based at least in part on whether the current rate exceeds a threshold rate; and
at least one hardware processor configured to execute the sizing module, the policing module, the rate module, and the handling module.

12. The system of claim 11, wherein the rate module further determines:
an average rate of packets tracked by the packet policer during a certain time interval; and
an average rate of packets tracked by at least one additional packet policer within the plurality of packet policers during the certain time interval.

13. The system of claim 12, wherein the policing module further adjusts, based on the average rates of packets tracked by the packet policer and the additional packet policer during the certain time interval, the threshold rate such that a number of packets that exceed the adjusted threshold rate during a subsequent time interval corresponds to a number of packets that exceed an additional threshold rate implemented by the additional packet policer during the subsequent time interval.

14. The system of claim 12, wherein the policing module further adjusts, based on the average rates of packets tracked by the packet policer and the additional packet policer during the certain time interval, the threshold rate such that a number of packets that exceed the adjusted threshold rate during a subsequent time interval differs, by a certain amount, from a number of packets that exceed an additional threshold rate implemented by the additional packet policer during the subsequent time interval.

15. The system of claim 12, wherein the policing module further adjusts, based on the average rates of packets tracked by the packet policer and the additional packet policer during the certain time interval, the range of packet sizes tracked by the packet policer such that an average rate of packets tracked by the packet policer during a subsequent time interval corresponds to an average rate of packets tracked by the additional packet policer during the subsequent time interval.

16. The system of claim 12, wherein the policing module further adjusts, based on the average rates of packets tracked by the packet policer and the additional packet policer during the certain time interval, a burst-size limit implemented by the packet policer such that a number of packets that exceed the adjusted burst-size limit during a subsequent time interval corresponds to a number of packets that exceed an additional burst-size limit implemented by the additional packet policer during the subsequent time interval.

17. The system of claim 12, wherein the policing module further:
determines a total threshold rate for all packets tracked by the plurality of packet policers; and
allocates a portion of the total threshold rate to each of the plurality of packet policers.

18. The system of claim 12, wherein:
the rate module further detects a potential denial-of-service (DoS) attack directed to the network device; and
the policing module further lowers the threshold rate to mitigate the potential DoS attack.

19. The system of claim 12, wherein the handling module discards the packet based at least in part the current rate of packets tracked by the packet policer exceeding the threshold rate.

20. A non-transitory computer-readable medium comprising computer-readable instructions that, when executed by at least one processor of a computing device, cause the computing device to:
determine a size of a packet received at a network device;
identify, within a plurality of packet policers that track rates of packets with various sizes received at the network device, a packet policer that tracks rates of packets whose sizes are within a range that includes the size of the packet;
determine a current rate of packets tracked by the packet policer; and
handle the packet based at least in part on whether the current rate exceeds a threshold rate.

* * * * *